(12) United States Patent
Sampson

(10) Patent No.: US 7,090,194 B2
(45) Date of Patent: Aug. 15, 2006

(54) SELF-PRIMING DRAIN VALVE

(76) Inventor: Richard J. Sampson, 32 Hovey St., Quincy, MA (US) 02171

( * ) Notice: Subject to any disclaimer, the term of this patent is extended or adjusted under 35 U.S.C. 154(b) by 18 days.

(21) Appl. No.: 10/899,932

(22) Filed: Jul. 27, 2004

(65) Prior Publication Data
US 2006/0022162 A1 Feb. 2, 2006

(51) Int. Cl.
F16K 51/00 (2006.01)
(52) U.S. Cl. .................. 251/319; 251/144; 222/501
(58) Field of Classification Search ............... 222/501; 251/319
See application file for complete search history.

(56) References Cited

U.S. PATENT DOCUMENTS

| 286,475 | A | * | 10/1883 | Neisendorfer | 251/176 |
|---|---|---|---|---|---|
| 1,339,665 | A | * | 5/1920 | Otto et al. | 251/210 |
| 1,467,492 | A | * | 9/1923 | Olson | 137/245.5 |
| 2,373,294 | A | * | 4/1945 | Cornelius | 137/600 |
| 2,638,108 | A | * | 5/1953 | Williams et al. | 137/102 |
| 2,702,563 | A | * | 2/1955 | Snyder et al. | 137/588 |
| 2,764,324 | A | * | 9/1956 | Landreth | 222/501 |
| 3,761,052 | A | * | 9/1973 | Tobbe et al. | 251/88 |
| 4,271,986 | A | * | 6/1981 | Stecker | 222/151 |
| 4,477,056 | A | * | 10/1984 | Alexius | 251/282 |
| 4,742,942 | A | * | 5/1988 | Dokos et al. | 222/501 |
| 6,227,236 | B1 | * | 5/2001 | Kusumoto et al. | 137/341 |
| 6,805,262 | B1 | * | 10/2004 | Frazier | 222/108 |

* cited by examiner

Primary Examiner—J. Casimer Jacyna

(57) ABSTRACT

Provided is a self-priming drain valve suitable for draining liquid from a tank wherein sediment and other solid matter has accumulated. The valve includes a reverse thread, stem-down to close operation, which allows the valve stem, and attached plug, to disturb the accumulated solid matter that is at rest at the valve's inlet. This disturbing action provides the inertia necessary to disturb the solid matter and begin the free flow of the tank's contents.

11 Claims, 3 Drawing Sheets

SELF-PRIMING DRAIN VALVE

BACKGROUND OF THE INVENTION

1. Field of the Invention

This invention relates generally to the field of liquid handling and storage and more particularly to a self-priming drain valve.

2. Description of the Related Art

A variety of storage systems have been devised to handle liquid loads and similar cargo. A typical storage system often includes a tank and may also include associated piping. The particular type of system and configuration will factor into the types of problems that the system may incur. Additionally, the type of liquid that the system handles also plays an important role in determining the possible difficulties users of the system may encounter.

There are many reasons for accessing a liquid handling system. If the system needs repairs, scheduled maintenance, or modifications, the system will often require being accessed in some manner. Many liquid systems include what are known as cut-off, or isolation valves. These valves perform the function their name implies, segregating the affected portion of the system to allow for the desired work to be done. However, even with the use of such valves, the system is often pressurized, or contains liquid within the section to be accessed. As a result, it is necessary to drain, or bleed off, some portion of the system prior to making repairs or performing maintenance activities.

Liquid handling system technology has evolved many methods of performing this function. Piping may often include small bleed off valves, or the system may include drain valves at certain points, including drain valves on a portion of a liquid holding tank. While extremely useful, these valves often experience problems themselves. For exampled, the liquid itself may include various amounts of particulate matter, which blocks the drain valves. The system itself may contribute rust and other solids to the liquid, or solid matter may precipitate out of the liquid and collect at various points within the system.

This sediment and particulate matter will tend to accumulate wherever there is a restriction of the flow within the system, such as a pipe bend. If the system is one wherein there is not a great deal of liquid flow, solid matter may accumulated at any point. Many systems incorporate filters and other screening systems in an attempt to purify the liquid.

All of the aforementioned problems may be illustrated in a variety of systems and different liquids. The problems can be found in residential applications as well as commercial. For example, the relatively simple residential water system experiences many of these problems. A prime exampled is a hot water tank.

Water heaters typically do not receive the appropriate maintenance for the simple reason that they have no moving parts and are often out of sight and mind. However, hot water tank performance is constantly being degraded by two things: sediment and rust.

Many steel hot water tanks include a glass liner to prevent rust. However, lining is not a foolproof solution, and the constant temperature fluctuations of the water within the tank cause the liner to expand and contract, resulting in tiny openings. When water eventually penetrates the lining, the tank will begin to rust. The rust then becomes deposited on the bottom of the hot water tank.

Simultaneously, the heating of the water causes calcium carbonate to form within it. As the calcium carbonate forms, it also settles to the bottom of the tank. In gas-heated water heaters, the sediment and rust eventually becomes thick enough at the bottom of the tank to reduce the heating efficiency. In electric tanks, sediment bonds to the heating element itself, forming a hard crust that may eventually render the element useless.

Draining of the hot water tank should be performed once a year to combat these problems. However, the average homeowner does not perform any maintenance on the hot water heater; rather replacement of a failed heater is often the alternative to yearly maintenance. Replacement of a hot water heater includes removal of the old tank. The only practical way of accomplishing this task is to drain the fifty gallons of a water that a typical tank holds.

This task becomes futile, however, if sediment and rust has built up upon the bottom of the tank, effectively blocking the drain valve. When the tank is in need of replacement, it is almost always the case that a layer of sediment and rust has built up above the point where the drain valve is located. There may exist other methods of penetrating the tank and utilizing a pump to drain the water, but this theory does not hot water tank filled with fifty gallons of water that can not be drained.

Unfortunately, the only recourse left to the repair personnel is to forcibly remove the installed drain valve. Damage to the water heater is not a concern, as the heater is being replaced in any event. What does happen, is that the fifty gallons of water in the tank will now come rushing out, with no means of containing it. If this scenario plays out in an unfinished basement, the only cost is the time it takes for the homeowner to clean up the mess with buckets and swabs. However, if the hot water heater is located in any other location, or the owner does not want some fifty gallons of water spilling out uncontrollably, some other solution is necessary. More particularly, in a multi-family home, or in any building where a hot water heater is installed somewhere other than a basement, such as an overhead, the owner will require the water to be drained in a controlled fashion.

The prior art does not provide a solution that adequately solves the problem. For exampled, the patent granted to Jenkins, U.S. Pat. No. 232,724, discloses a gage-cock that includes a rod for cleaning the internal portions of the device.

The patent granted to Fink, Jr., U.S. Pat. No. 743,702, discloses another gage-cock that includes a rod that is capable of being pushed forward and backward within the steam or water way for clearing obstructions. The rod is held in place when not in use via system pressure.

Murdock, U.S. Pat. No. 751,538 discloses a gage-cock assembly that includes a rod whose forward portion is threaded and terminates in a pointed end. When a separate hand wheel is turned, the threaded rod will travel forward until the pointed end projects into a boiler, thereby forcing out any obstructions.

Hinckley, U.S. Pat. No. 1,069,013 discloses a cleaning device for gage-cocks comprising a cleaning rod tipped with a scraper blade that is inserted into the bore of the valve. The blade may scrape the inside of the bore, as well as project through the mouth of the valve.

Olson, U.S. Pat. No. 1,467,492 discloses a device that combines a feed valve with a cleaner. The valve stem includes a flattened portion that cooperates with a slot in a cleaning head that will travel along with the valve stem as it is turned. The cleaning head may also be extended through the mouth of the valve. While these above-mentioned prior art patents disclose a general solution for removing obstructions in a valve or similar device, none disclose a solution amenable to the problems discussed above.

A prior art patent that comes closer to solving the problem is that granted to Watt, U.S. Pat. No. 5,964,243. Watt discloses a drain valve that includes a rod designed to pierce a layer of sediment that may have built up within a tank filled with fluid. The rod is connected to the opening means of the valve on one end, and includes a piercing tip on the other. The rod can turn along its axis and is designed to either move with the valve stem, or independently from it. The piercing tip may be made of a wear resistant element. When retracted the piercing tip is designed to provide a closing means for the valve, in that its diameter is closely related to that of the valve opening. The rod is moved along its axis by means of hydraulic pressure. Although this device is designed to pierce a layer of sediment, it is much more complicated than necessary of a hot water tank application. Additionally, the use of hydraulic pressure to actuate the valve mechanism results in an unworkable solution for a hot water tank application. Although the device disclosed in Watt may be suitable for its intended application, it does not solve the problems at hand.

Therefore, what is desired is a drain valve that is inexpensive to manufacture, and easy to install and use.

It is also desired that the drain valve include the option of either being permanently affixed to a tank, such as a hot water heater, or include means for removal such as threading.

It is also desired that the drain valve include means to overcome the problems associated with layers of sediment in rust that have accumulated on the bottom of the water heater.

Also desired is a method for draining water out of a tank in a controlled fashion so that the tank's contents may be captured.

BRIEF SUMMARY OF THE INVENTION

Accordingly, it is an object of the present invention to provide a means for draining liquid that is inexpensive to manufacture.

It is also an object of the present invention to provide a means for draining liquid from a tank, or in line, that may be permanently attached, or include means for removal such as threads.

It is also an object of the invention to drain liquid from a system, even when that system includes a volume of sediment or other solid matter.

It is a further object of the invention to provide a means of disturbing any existing layers of sediment so as to create the inertia necessary begin the free flow of the liquid.

BRIEF DESCRIPTION OF THE SEVERAL VIEWS OF THE DRAWINGS

These and other features, aspects and advantages of the present invention will become better understood with reference to the following description, appended claims, and accompanying drawings where:

DETAILED DESCRIPTION OF THE INVENTION

Figure 1:
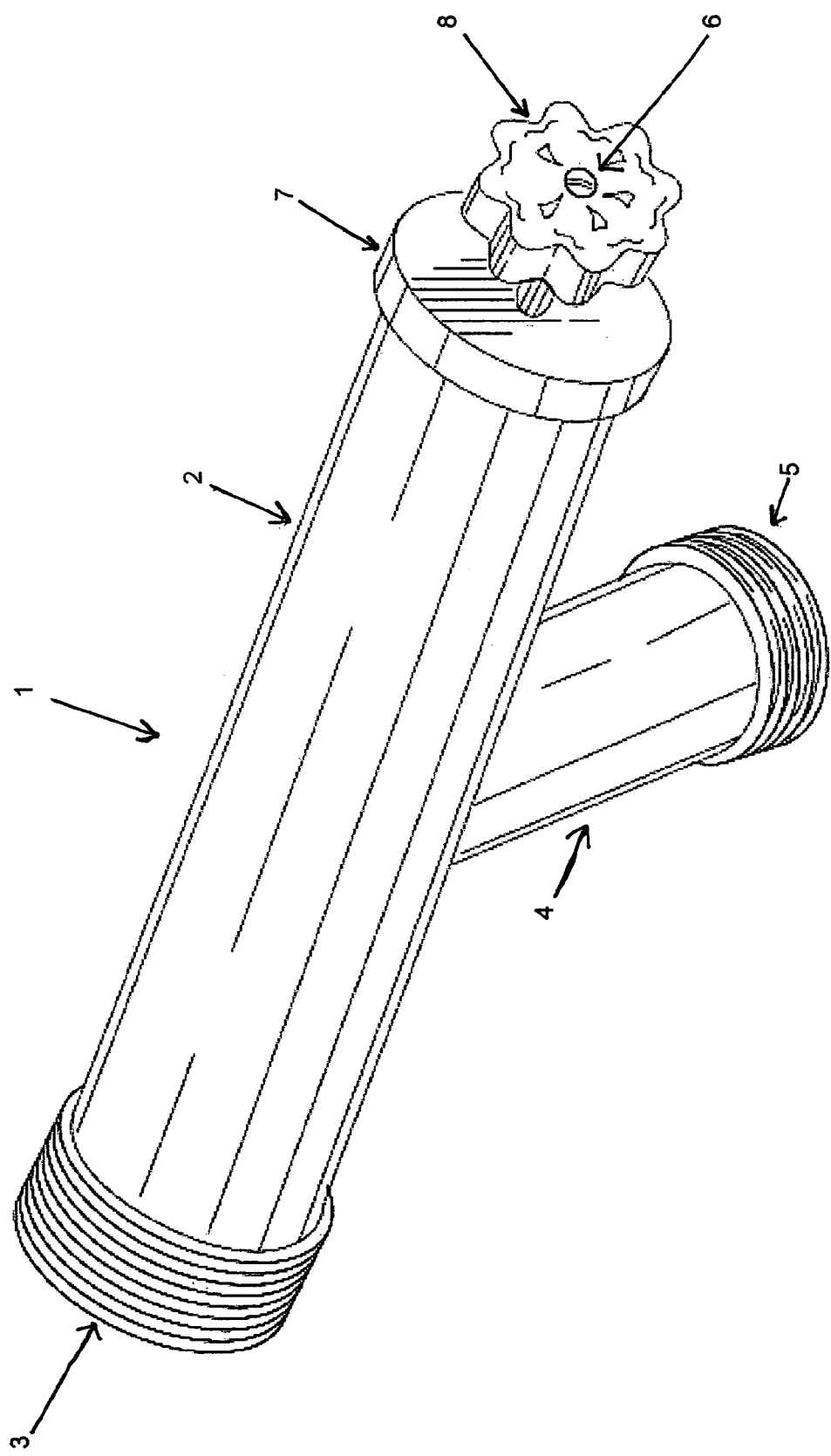
FIG. 1 is a perspective view of the drain valve of the present invention.

FIG. 1 illustrates a perspective view of drain valve 1 of the present invention displaying valve body 2, and inlet 3 along with outlet 4. Hose attachment means 5 is also displayed at the end of outlet 4. Handle 8 is shown along with retaining screw 6, biasing valve cap 7. In the preferred embodiment, as shown, hose attachment means 5 comprises standard sized threads for attaching a drain hose. In other embodiments, hose attachment means may comprise a quick-connect attachment surface, or a surface capable of receiving a hose and clamp assembly.

Figure 2:
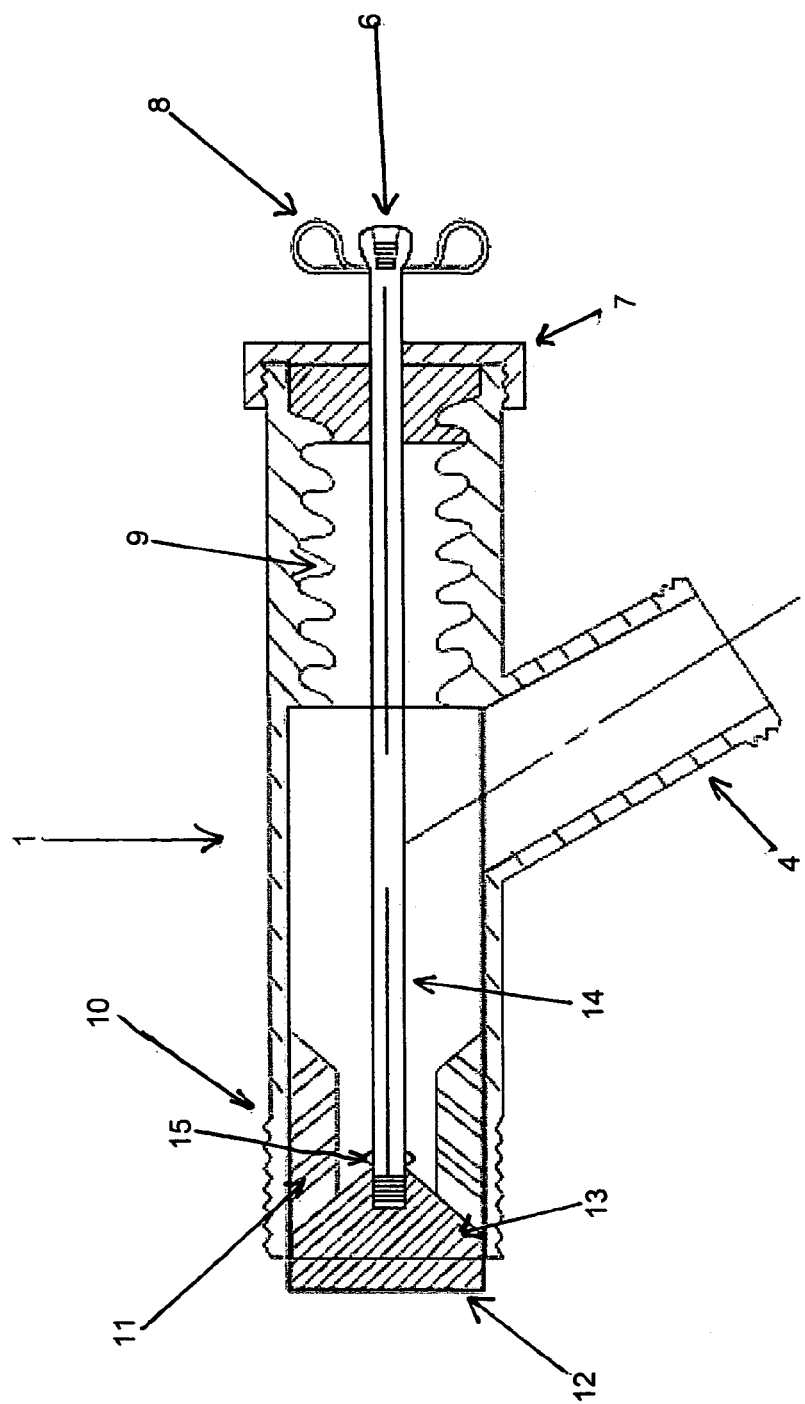
FIG. 2 is a sectional view of the drain valve of the present invention illustrating the valve in a closed position.

As seen in FIG. 2, the internal parts of drain valve 1 are shown via the sectional view. Valve stem 14 is preferably centrally located within valve body 2, and the plug end is displayed with the disc portion 12 and tapered portion 13 of the valve plug attached. In the preferred embodiment, valve stem 14 is secured to the disc portion 12 of the valve plug by means of a threaded portion as shown. Tapered portion 13 is then securely fastened between the disc portion 12 and the beveled portion 15. It will be clear to those skilled in the art that the beveled portion 15 assists in preventing the tapered portion 13 from riding up valve stem 14.

In the preferred embodiment, tapered portion 13 comprises a rubber tapered washer. Tapered portion 13 may then be sealably adjacent to plug seat 11, so at least a water tight seal is formed.

Valve cap 7 seals the closed end of drain valve 1, and in the preferred embodiment includes threads for ease of assembly, removal and maintenance, as necessary. Valve stem 14 and handle 8 are combined via retaining screw 6. Exterior threaded portion 10 also allows the drain valve to be easily installed into the desired system. In the preferred embodiment, the drain valve may be screwed into the exterior side of a water heater tank during assembly and/or installation.

Figure 3:
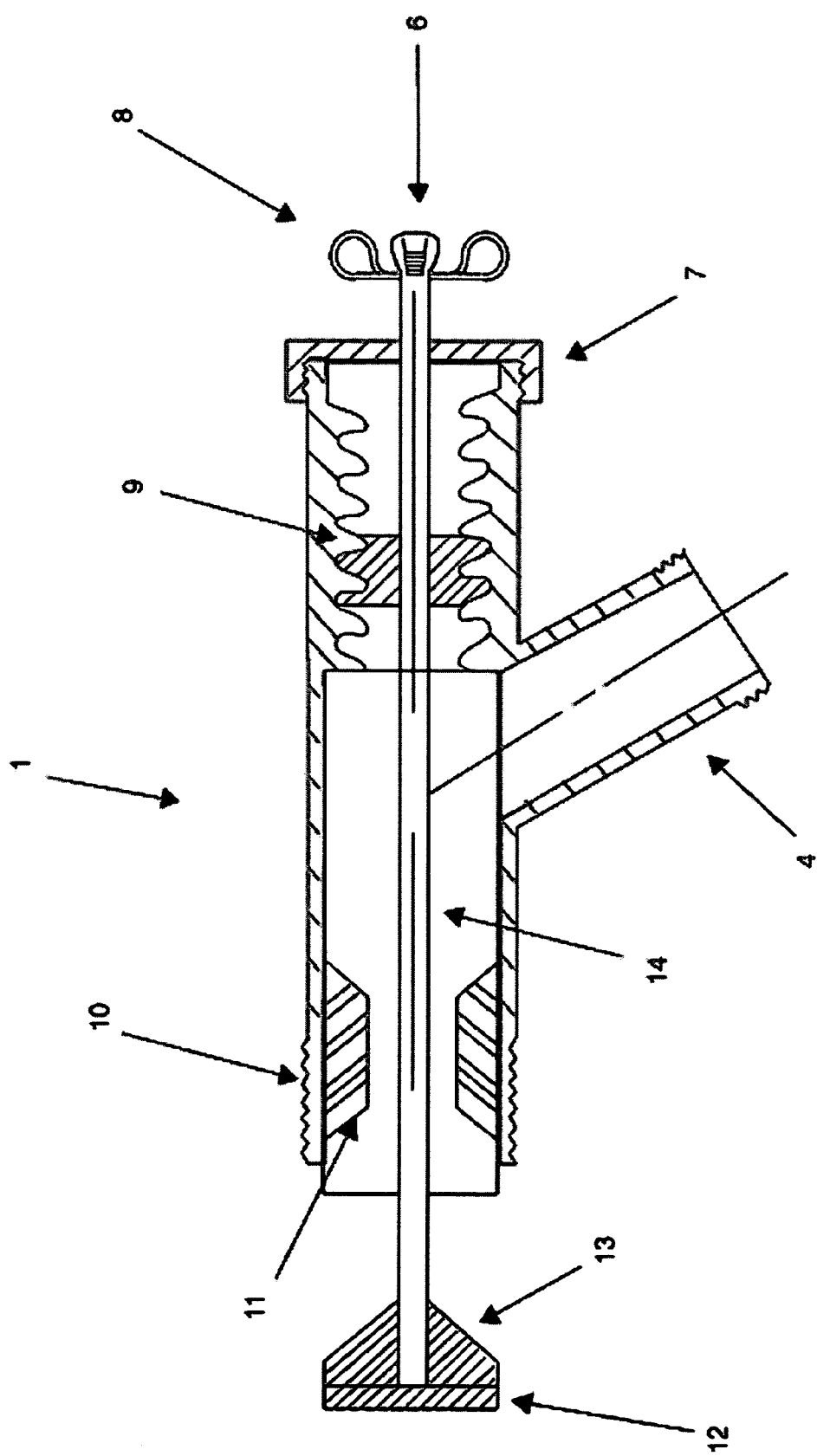
FIG. 3 is a sectional view of the drain valve of the present invention illustrating the valve in an open position.

FIG. 3 illustrates a sectional view of drain valve 1 in an open position. It will be clear to those skilled in the art that interior threaded portion 9 comprise reverse threads in the preferred embodiment. The result of this embodiment is that the drain valve 1 comprises a stem-up to close and stem-down to open configuration. This embodiment thereby provides for the disturbing action of the valve plug. The disturbing action is accomplished by means of the extension of the plug into the sediment layer, whereby the flow of liquid begins. Once the flow of liquid is started, it will continue until the tank is sufficiently drained.

The tapered rubber washer of the preferred embodiment will ensure a good seal is obtained between the plug and the seat. Those skilled in the art will appreciate that plug may be screwed onto the valve stem, or permanently attached during fabrication. The drain valve may be made of a variety of materials, plastic being the least expensive, but brass or other metals may also be used. The drain valve is preferably affixed to the hot water tank during fabrication of the tank, or afterwards at a secondary site by a distributor or the like.

It will also be appreciated that as a result of the present invention, repair personnel will no longer be faced with forcibly removing prior art drain valves. Repair personal will also not have to resort to potentially damaging drain valves by snaking implements of narrow diameters through the internal portion of prior art drain valves.

Although the present invention has been described with reference to particular embodiments, it will be apparent to those skilled in the art that variations and modifications can be substituted therefore without departing from the principles and spirit of the invention.

What is claimed is:

1. A drain valve comprising:
   a valve body, wherein said valve body includes an inlet, said inlet located at an open end of said valve body, and wherein said valve body includes an outlet, and wherein said valve body includes closed end;
   a valve cap substantially covering said closed end of said valve body;
   a valve stem including a operating end and a plug end, wherein said valve stem is substantially located within a central portion of said valve body, and wherein said operating end of said valve stem extends through said valve cap, and where said valve stem may be positioned axially with relation to said valve body, and wherein said valve body includes an interior threaded portion, wherein said interior threaded portion is in substantial communication with said valve stem, and; a handle attached to said operating end of said valve stem, wherein said handle is in communication with said valve stem, such that said drain valve is capable of achieving a closed position and said drain valve is capable of achieving an open position;
   a valve plug attached to said plug end of said valve stem, wherein said valve plug further comprises a disc portion and said valve plug further comprises a tapered portion, and wherein said tapered portion further comprises a tapered washer, and wherein said valve stem includes a beveled portion, wherein said beveled portion is located substantially adjacent to said tapered washer, and wherein said valve plug extends beyond said open end of said valve body when said drain valve has achieved said open position; and
   a plug seat located substantially near said inlet of said valve body, wherein said plug seat is capable of being sealably related to said valve plug.

2. The drain valve of claim 1, wherein said valve plug is sealably related to said plug seat when said drain valve has achieved said closed position.

3. The drain valve of claim 2, wherein said closed end of said valve body includes an exterior threaded portion.

4. The drain valve of claim 3, wherein said valve cap is attached to said valve body by means of said exterior threaded portion.

5. The drain valve of claim 4, wherein said handle is attached to said valve stem by means of a retaining screw.

6. The drain valve of claim 5, wherein said plug end of said valve stem includes stem threads.

7. The drain valve of claim 6, wherein said valve plug is attached to said valve stem by means of said stem threads.

8. The drain valve of claim 7, wherein said outlet includes a hose attachment means.

9. The drain valve of claim 8, wherein said hose attachment means includes outlet threads.

10. The drain valve of claim 8, wherein said hose attachment means comprises a quick-release connection.

11. A drain valve comprising:
   a valve body, wherein said valve body includes an inlet, said inlet located at an open end of said valve body, and wherein said valve body includes an outlet, and wherein said valve body includes closed end;
   a valve cap substantially covering said closed end of said valve body, said valve cap attached to said closed end of said valve body by means of an exterior threaded portion;
   a valve stem including a operating end and a plug end, wherein said valve stem is substantially located within a central portion of said valve body, and wherein said operating end of said valve stem extends through said valve cap, and where said valve stem may be positioned axially with relation to said valve body, and wherein said valve body includes a beveled portion;
   a handle attached to said operating end of said valve stem, wherein said handle includes a retaining screw;
   a valve plug attached to said plug end of said valve stem, wherein said valve plug comprises a disc portion and said valve plug comprises a tapered washer, said tapered washer being substantially adjacent to said beveled portion of said valve stem, and wherein said valve plug extends beyond said inlet when said drain valve is in an open position; and
   a plug seat located substantially near said inlet of said valve body, wherein said plug seat is capable of being sealably related to said valve plug when said drain valve is in a closed position.

* * * * *